Feb. 24, 1948.    J. H. WOOD, JR    2,436,683
GENERATOR FOR PIPE LINES
Filed April 6, 1945

Attest
Robert T. Staples
Andrew T. Zodl

Inventor
Joseph H. Wood, Jr.
By Norbert E. Birch
Attorney

Patented Feb. 24, 1948

2,436,683

UNITED STATES PATENT OFFICE 2,436,683

GENERATOR FOR PIPE LINES

Joseph H. Wood, Jr., Dallas, Tex., assignor to Atlantic Pipe Line Company, Philadelphia, Pa., a corporation of Maine Application April 6, 1945, Serial No. 586,956

3 Claims. (Cl. 290—52)

The present invention relates to new and useful improvements in devices adapted to generate electric current, such devices obtaining their motivating energy from the flow of fluid being transported in a pipe line.

At the present time, pipelines carrying oil and similar products stretch over thousands of miles of countryside. It is apparent, therefore, that a great economic problem in connection with such lines is maintenance. This problem has been greatly increased due to electrolysis resulting from electro-chemical reaction between the pipe and the soil in which it may be buried.

It is well known in the art that such electrolysis can be overcome by introducing a small amount of electric current into the pipe to overcome the potential of any current which may be generated within the pipe or between the pipe and the surrounding soil. However, the great difficulty in using this solution of the problem has been that of obtaining electric current at isolated points along the pipeline. The cost of purchase and transportation of electric power to such points has proved prohibitively high. Gasoline engine powered generators located at points along the line have been found to be difficult to supply and maintain. Windmill powered generators have also been used, but, due to intermittent operation, have proved impractical.

Therefore, it is an object of the invention to provide a means associated with a pipeline which will use the pressure and flow of the fluid therein to generate electric current which can be utilized to prevent electrolysis in the pipe or for other purposes for which electric energy may be required.

It is a further object of the invention to provide a means for producing electric current which will require but little maintenance or repair to keep it in constant operation.

It is also an object of the invention to provide a means of the type described above which is relatively easy to install and economical to operate.

Other objects of the invention will be apparent from the description and claims which follow.

Reference is now made to the drawing, wherein like numerals are used to designate like parts.

Figure 2:
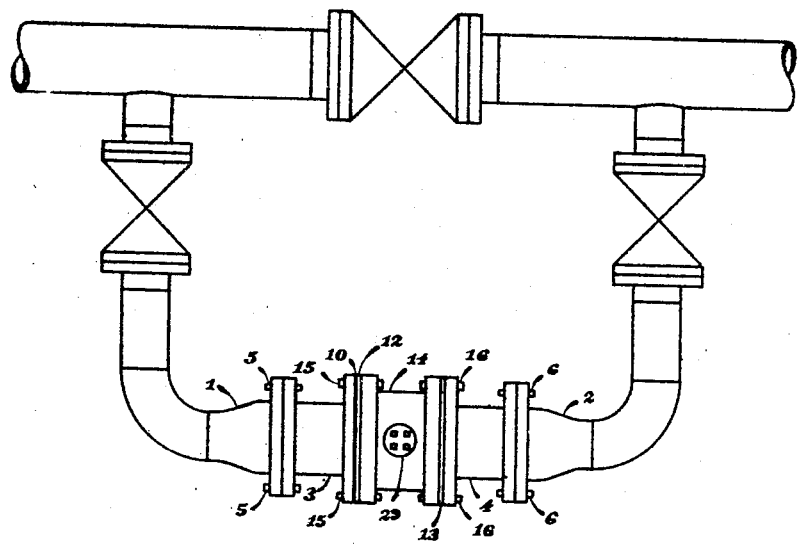
Figure 2 is a plan view of the device in relation to the pipe line.
Figure 1:
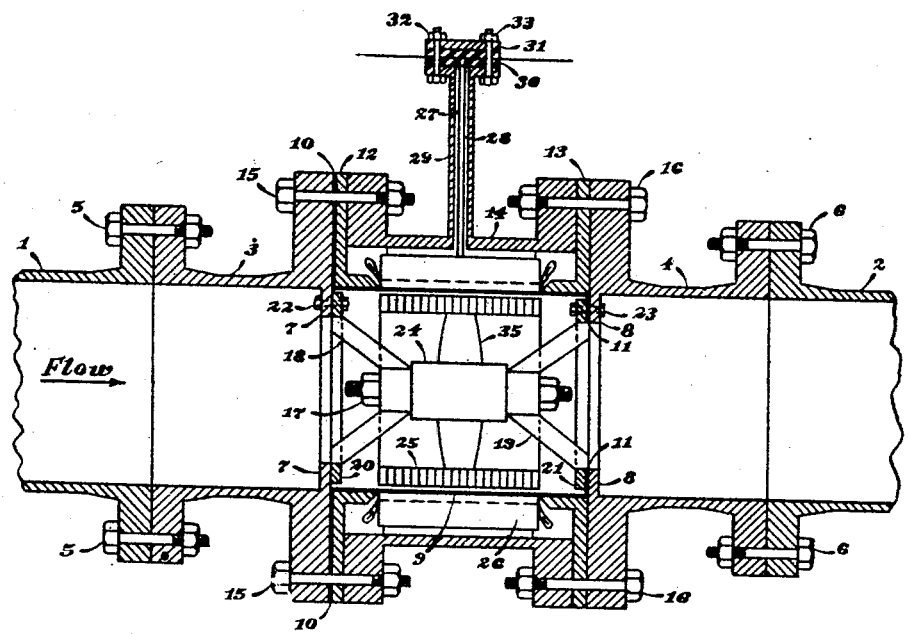
Figure 1 is a view of the device partially in vertical cross section.

In the drawing, 1 and 2 are flanged pipes affixed to flanged casings 3 and 4 by bolts 5 and 6 respectively, or by other suitable means. Casings 3 and 4 are formed with internal flanges 7 and 8 respectively, the purpose of which will be hereinafter described.

An insulating cylinder 9 made of fibre or other suitable non-magnetic insulating material and provided at opposite ends thereof with an external shoulder 10 and an internal shoulder 11 is positioned between casings 3 and 4 external shoulder 10 of said insulating cylinder being adjacent to casing 3 and internal shoulder 11 being adjacent to internal flange 8 on casing 4. The purpose of the insulating cylinder 9 will be described hereinafter.

A flange 12 is positioned adjacent the external shoulder 10 of insulating cylinder 9 and a similar flange 13 is positioned adjacent flanged casing 4. A flanged housing 14 is disposed around insulating cylinder 9 and spaced therefrom between flanges 12 and 13. Flanged casing 3, external shoulder 10 on insulating cylinder 9, flange 12 and housing 14 are fastened together by bolts 15 or by other suitable means. Flanged casing 4, flange 13, and housing 14 are fastened together by bolts 16, or by other suitable means.

Positioned within insulating cylinder 9 is bearing means 17 rigidly held axially of said cylinder by brackets 18 and 19 which bear at their outer extremities rings 20 and 21 respectively. Ring 20 is fastened by bolts 22 or by other suitable means, to internal flange 7 on flanged casing 3. Ring 21, internal shoulder 11 on insulating cylinder 9, and internal flange 8 on flanged casing 4 are fastened together by bolts 23, or by other suitable means.

A rotor 24 is mounted on bearing means 17 and is adapted to be rotated thereon by the flow of fluid through the pipeline impinging upon blades 35 of the rotor. It will be understood that while it is preferred to mount the rotor 24 on bearing means 17 so that said rotor will rotate on said bearing means, other methods or variations may be used without departing from the scope or spirit of the invention. For example, the rotor may be integral with a shaft mounted in end bearings in lieu of rotating about a fixed bearing means 17. Permanent magnets 25 are affixed to the periphery of blades 35 of rotor 24 and are adapted to create a moving magnetic field as said rotor revolves on bearing means 17.

Disposed around insulating cylinder 9 and adjacent thereto is a stator 26. Insulating cylinder 9, being interposed between the stator 26 and the rotor 24, provides a means whereby the stator windings are maintained out of contact with the fluid passing through the pipeline. External shoulder 10 and internal shoulder 11 on insulating cylinder 9 serve to strengthen said cylinder, provide a means whereby it can be held in proper relation to the other sections of the device, and also are adapted for use as gaskets between the various sections. It is apparent that the stator 26 surrounding insulating cylinder 9 and being adjacent thereto serves to reinforce the insulating cylinder and strengthen it against the pressure of the fluid in the pipeline. A suitable type of alternating current leads such as wires 27 and 28 conduct the current generated in stator 26 from said stator through conduit 29, and through rubber gasket 30. A cover plate 31 is positioned on gasket 30 and fastened to such gasket and to conduit 29 by bolts 32 and 33 or by other suitable means. Gasket 30 is adapted to provide not only insulation but also sealing against internal leakage.

It is apparent that the oil or similar product moving through the pipeline and impinging upon the blades 35 will cause the rotor 24 to revolve around bearing means 17, thereby setting up a moving magnetic field. As this field is cut by the windings on the stator 26, an electric current is generated in such windings which, when carried off by alternating current leads 27 and 28 can be conducted to the pipeline to prevent electrolysis therein or used in any other suitable manner.

In Figure 2, the device is shown positioned in a by-pass connected into the pipeline. This method of connection is preferable because neither the full amount of pipeline fluid nor the entire pressure is needed to actuate the generator. Therefore, since the device will operate with less than the total amount of pipeline fluid and pressure, it is preferred to connect such device into a by-pass so that the flow in the main pipe will not be retarded.

I claim:

1. A device for generating electrical energy actuated by the flow of fluid through a pipeline, comprising a housing adapted to form an integral stationary section of such line, bearing means rigidly disposed axially of said housing, a rotor positioned on said bearing means and adapted for operation while immersed in pipeline fluid, permanent magnets affixed to the periphery of the rotor to create a magnetic field, a stator surrounding the rotor and radially spaced therefrom, an insulating cylinder interposed between the stator and the rotor and provided with an internal shoulder and an external shoulder at the opposite ends thereof, and means for conducting electric current from the stator windings.

2. A device for generating alternating current actuated by the flow of fluid through a pipeline, comprising a housing adapted to form an integral stationary section of such line, bearing means rigidly affixed centrally of the housing on brackets affixed to the walls thereof, a rotor adapted to be rotated on the bearing means by the flow of fluid, blades affixed to the rotor, permanent magnets affixed to the blades at the periphery of the rotor to create a magnetic field, a stator surrounding the rotor and radially spaced therefrom, an insulating cylinder interposed between the stator and the rotor to prevent the contact of the fluid with the stator, said cylinder being provided with an internal shoulder and an external shoulder at opposite ends thereof, and means for conducting electric current from the stator windings.

3. A device for generating electrical energy by the utilization of the flow of fluid through a pipeline, comprising a housing adapted to form an integral stationary section of said line, bearing means rigidly disposed axially of said housing, a rotor positioned on said bearing means and adapted to be rotated by the flow of fluid through the pipeline, permanent magnets affixed to the periphery of the rotor to create a magnetic field, a stator surrrounding the rotor and radially spaced therefrom, an insulating cylinder rigidly secured by integral shoulder means intermediate the stator and the rotor, and means for conducting electric current from the stator windings.

JOSEPH H. WOOD, Jr.

REFERENCES CITED

The following references are of record in the file of this patent:

UNITED STATES PATENTS

| Number | Name | Date |
|---|---|---|
| 622,474 | Hoskin | Apr. 4, 1889 |
| 1,485,186 | Harza | Feb. 26, 1924 |
| 2,161,374 | Moineau | June 6, 1939 |
| 2,266,355 | Chun | Dec. 16, 1941 |
| 2,299,406 | Potter | Oct. 20, 1942 |

FOREIGN PATENTS

| Number | Country | Date |
|---|---|---|
| 853,775 | France | Dec. 16, 1939 |